United States Patent
Baba et al.

(10) Patent No.: US 11,150,947 B2
(45) Date of Patent: Oct. 19, 2021

(54) DETERMINING A DELETION DEADLINE FOR A STAGING ENVIRONMENT

(71) Applicant: TOYOTA JIDOSHA KABUSHIKI KAISHA, Toyota (JP)

(72) Inventors: Yasuhiro Baba, Gifu-ken (JP); Atsunori Ito, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/127,902

(22) Filed: Sep. 11, 2018

(65) Prior Publication Data

US 2019/0102225 A1 Apr. 4, 2019

(30) Foreign Application Priority Data

Oct. 4, 2017 (JP) .............................. JP2017-194154

(51) Int. Cl.
*G06F 9/48* (2006.01)
*G06F 9/50* (2006.01)

(52) U.S. Cl.
CPC ............ *G06F 9/4887* (2013.01); *G06F 9/485* (2013.01); *G06F 9/5077* (2013.01)

(58) Field of Classification Search
CPC ....... G06F 9/485; G06F 9/4887; G06F 9/5077
See application file for complete search history.

(56) References Cited

U.S. PATENT DOCUMENTS

| 2011/0246813 A1* | 10/2011 | Collier ................ G06F 11/2035 714/3 |
| 2013/0191610 A1* | 7/2013 | Burka ................... G06F 12/122 711/206 |
| 2015/0363238 A1 | 12/2015 | Bai et al. |
| 2016/0170792 A1 | 6/2016 | Kato |
| 2017/0329695 A1* | 11/2017 | Bhole ..................... G06F 11/302 |
| 2018/0293067 A1* | 10/2018 | Hirshberg ........... G06F 9/45558 |
| 2019/0205177 A1* | 7/2019 | Le Rhun ............... G06F 9/5038 |

FOREIGN PATENT DOCUMENTS

| JP | 2010-215235 A | 9/2010 |
| JP | 2012-069056 A | 4/2012 |
| JP | 2014174596 A | 9/2014 |
| JP | 2015-153370 A | 8/2015 |
| JP | 2016048833 A | 4/2016 |
| JP | 2016115333 A | 6/2016 |
| JP | 2016143202 A | 8/2016 |
| JP | 2016149615 A | 8/2016 |
| JP | 2017058734 A | 3/2017 |
| WO | 2014155654 A1 | 10/2014 |

OTHER PUBLICATIONS

Toru Moriyama, "Countermeasures against Natural Calamities by Private Cloud, Virtualization Reduces "Insurance Premium"", Nikkei Computer, Nikkei BP Corp., Dec. 22, 2010, No. 772, pp. 48-55.

* cited by examiner

*Primary Examiner* — Jorge A Chu Joy-Davila
(74) *Attorney, Agent, or Firm* — Hunton Andrews Kurth LLP

(57) ABSTRACT

An information processing device includes a processor. The processor is configured to decide a deletion deadline of a second environment based on a predetermined condition relating to an application having a first environment that is a production environment and the second environment that is a staging environment, and delete the second environment when the decided deletion deadline arrives.

4 Claims, 4 Drawing Sheets

DETERMINING A DELETION DEADLINE FOR A STAGING ENVIRONMENT

INCORPORATION BY REFERENCE

The disclosure of Japanese Patent Application No. 2017-194154 filed on Oct. 4, 2017 including the specification, drawings and abstract is incorporated herein by reference in its entirety.

BACKGROUND

1. Technical Field

The disclosure relates to an information processing device, an information processing method, and a non-transitory computer-readable medium storing a program.

2. Description of Related Art

In a computer system, when a version upgrade of an application or the like is performed, a test of the application or the like is performed in a staging environment. When sufficient quality is ensured by the test, the staging environment is released as a production environment and a previous version production environment is held as a staging environment for backup.

The circumstances as described above are also the same when a computer resource (hereinafter, simply referred to as "resource") that the application is provided by cloud computing (hereinafter, simply referred to as "cloud") is used.

In the cloud, a charging amount generally increases with an increase in a resource amount to be used. Therefore, the staging environment for backup (previous version production environment) is desired to be deleted promptly after the test of the application ends and the staging environment of the application is released as the production environment.

SUMMARY

However, since a period until the staging environment for backup is not needed differs depending on applications, the deletion of the staging environment of each application simply after a uniform period elapses is inappropriate. Thus, the deletion of the staging environment is performed manually. As a result, schedule management of deletion work is complicated, and deletion omission, a deletion delay, or the like may occur. The situations as described above cause an increase in a use period of an unneeded resource and are not economical.

The disclosure provides an information processing device, an information processing method, and a non-transitory computer-readable medium storing a program that improve economic efficiency relating to use of a computer resource.

A first aspect of the disclosure relates to an information processing device including a processor. The processor is configured to decide a deletion deadline of a second environment based on a predetermined condition relating to an application having a first environment that is a production environment and the second environment that is a staging environment, and delete the second environment when the decided deletion deadline decided arrives.

Thus, the staging environment can be automatically deleted at a time according to circumstances for each application.

Therefore, economic efficiency relating to use of a computer resource can be improved.

In the information processing device according to the first aspect of the disclosure, the processor may be configured to decide the deletion deadline based on a use situation of the application in the production environment.

Thus, for example, deletion deadlines for an application having use frequency higher than a predetermined use frequency and an application having use frequency lower than the predetermined use frequency can be changed.

Therefore, an appropriate time for each application can be set as the deletion deadline.

In the information processing device according to the first aspect of the disclosure, the use situation may include the number of accesses, the requested number of virtual servers, and a central processing unit (CPU) load.

Thus, for example, deletion deadlines for an application having use frequency higher than the predetermined use frequency and an application having use frequency lower than the predetermined use frequency can be changed.

Therefore, an appropriate time for each application can be set as the deletion deadline.

In the information processing device according to the first aspect of the disclosure, the processor may be configured to decide the deletion deadline based on a parameter set in advance according to a characteristic of the application.

Thus, a time according to a degree of need for the staging environment for each application can be set as the deletion deadline.

Therefore, an appropriate time for each application can be set as the deletion deadline.

In the information processing device according to the first aspect of the disclosure, the characteristic of the application may include an index indicating importance of a service by the application, an allowable time from a failure to recovery when the failure occurs in the application, and an estimated number of users who use the application.

Thus, a time according to the degree of need for the staging environment for each application can be set as the deletion deadline.

Therefore, an appropriate time for each application can be set as the deletion deadline.

In the information processing device according to the first aspect of the disclosure, the processor may be configured to, when a deletion deadline for the application is set in advance, decide the deletion deadline of the second environment that is not the production environment based on the deletion deadline that is set in advance.

Thus, the deletion of the staging environment at a time not intended by an administrator can be avoided.

Therefore, the administrator can restrict the deletion timing of the staging environment.

A second aspect of the disclosure relates to an information processing method executed by a computer. The information processing method includes deciding a deletion deadline of a second environment based on a predetermined condition relating to an application having a first environment that is a production environment and the second environment that is a staging environment, and deleting the second environment when the decided deletion deadline arrives.

Thus, the staging environment can be automatically deleted at a time according to circumstances for each application.

Therefore, the economic efficiency relating to use of a computer resource can be improved.

A third aspect of the disclosure relates to a non-transitory computer-readable medium storing a program causing a computer to execute a process. The process includes deciding a deletion deadline of a second environment based on a predetermined condition relating to an application having a first environment that is a production environment and the second environment that is a staging environment, and deleting the second environment when the decided deletion deadline arrives.

Thus, the staging environment can be automatically deleted at a time according to circumstances for each application.

Therefore, the economic efficiency relating to use of a computer resource can be improved.

The economic efficiency relating to the use of the computer resource can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
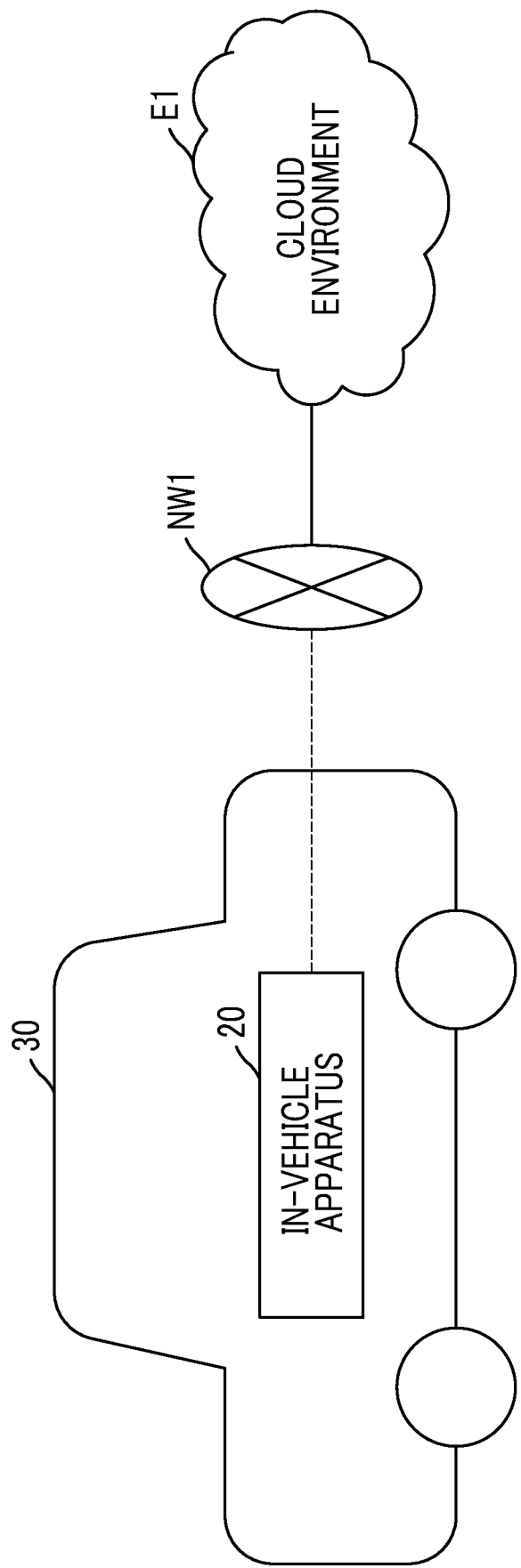
FIG. 1 is a diagram showing a system configuration example according to an embodiment of the disclosure.

Hereinafter, an embodiment of the disclosure will be described based on drawings. FIG. 1 is a diagram showing a system configuration example according to the embodiment of the disclosure. An in-vehicle apparatus 20 and a cloud environment E1 can communicate with each other through a predetermined communication network NW1 including a mobile communication network which is a wireless communication network with a plurality of base stations as a terminal, an internet network, and the like. FIG. 1 shows solely one in-vehicle apparatus 20 for convenience, but each in-vehicle apparatus 20 of a plurality of vehicles 30 can communicate with the cloud environment E1 through the communication network NW1.

The in-vehicle apparatus 20 is mounted on the vehicle 30 and is a device having an information processing function and a communication function. For example, the in-vehicle apparatus 20 may include a navigation system. In the embodiment, the in-vehicle apparatus 20 accesses an application installed in the cloud environment E1 to provide a user interface relating to a service by the application to an occupant such as a driver of the vehicle 30.

The cloud environment E1 is a set of one or more computers (information processing devices 10) and is an environment for realizing cloud computing in a data center or the like. In the embodiment, various applications for providing services to the in-vehicle apparatus 20 are installed in the cloud environment E1.

Figure 2:
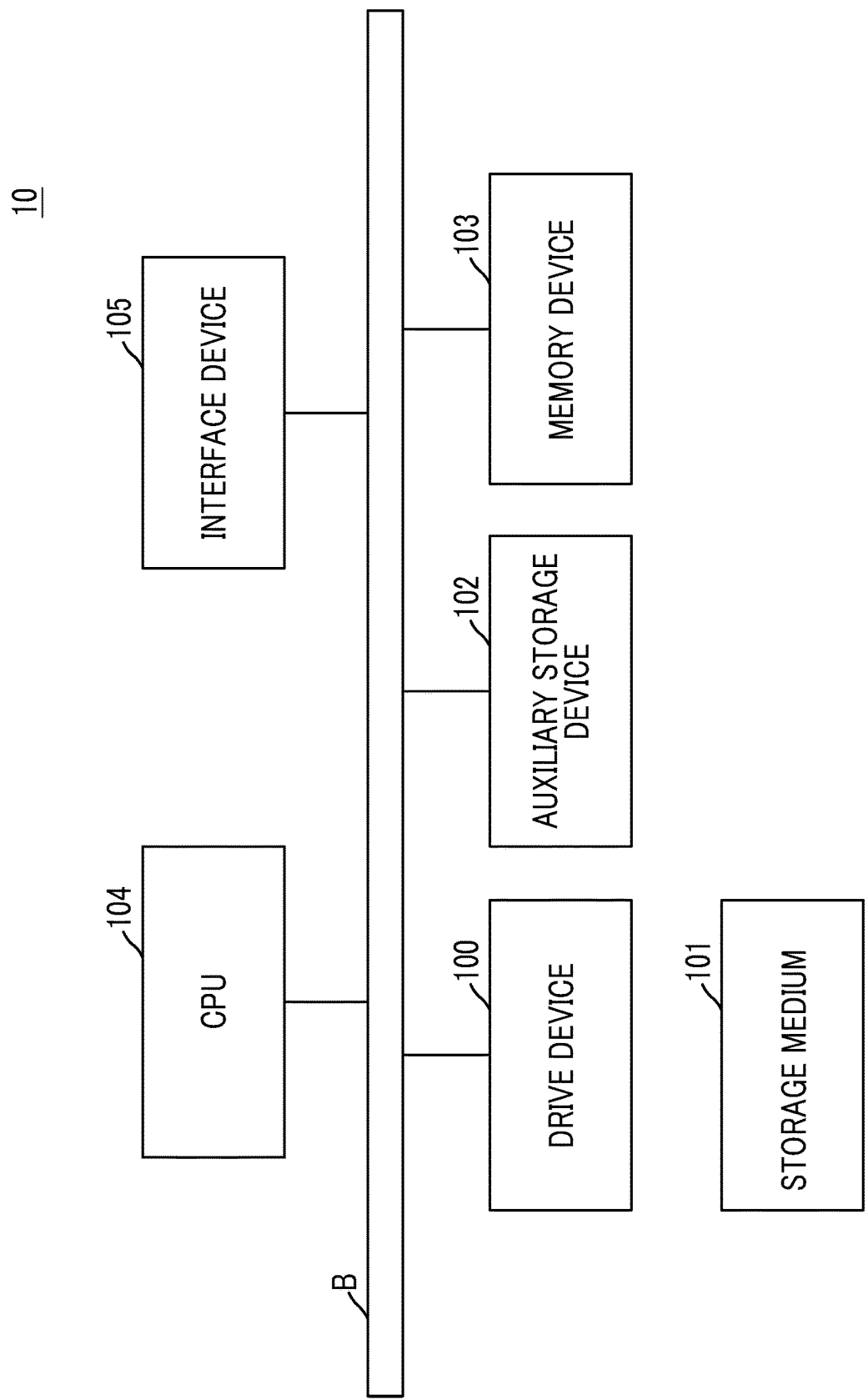
FIG. 2 is a diagram showing a hardware configuration example of an information processing device configuring a cloud environment according to the embodiment of the disclosure.

FIG. 2 is a diagram showing a hardware configuration example of the information processing device 10 configuring the cloud environment E1 according to the embodiment of the disclosure. The information processing device 10 of FIG. 2 includes a drive device 100, an auxiliary storage device 102, a memory device 103, a CPU 104, an interface device 105, and the like which are mutually connected through a bus B.

A program for realizing a process in the information processing device 10 is provided by a storage medium 101 such as a compact disc read only memory (CD-ROM). When the storage medium 101 storing the program is set in the drive device 100, the program is installed from the storage medium 101 to the auxiliary storage device 102 through the drive device 100. However, the program is not always needed to be installed by the storage medium 101 and may be downloaded by another computer through a communication network. The auxiliary storage device 102 stores the installed program, a needed file, data, and the like.

When there is an instruction to activate the program, the memory device 103 reads and stores the program from the auxiliary storage device 102. The CPU 104 executes a function relating to the information processing device 10 in accordance with the program stored in the memory device 103. The interface device 105 is used as an interface for connecting to the communication network.

Figure 3:
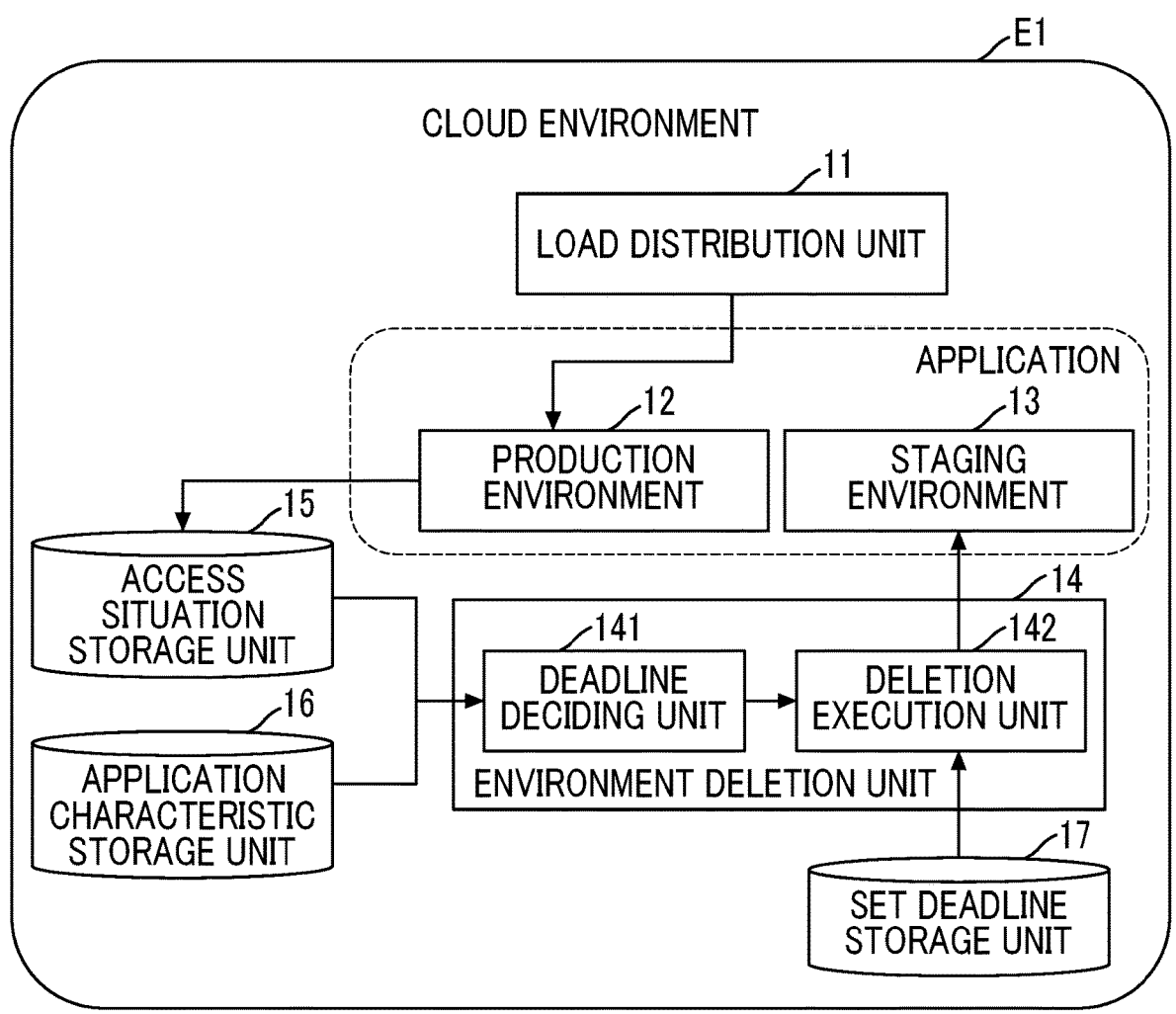
FIG. 3 is a diagram showing a function configuration example of the cloud environment according to the embodiment of the disclosure.

FIG. 3 is a diagram showing a function configuration example of the cloud environment E1 according to the embodiment of the disclosure. In FIG. 3, the cloud environment E1 includes a load distribution unit 11, a production environment 12 and a staging environment 13 for each application, an environment deletion unit 14, and the like. The respective units described above are realized by processes that one or more programs installed in any of information processing devices 10 configuring the cloud environment E1 cause the CPU 104 to execute. The cloud environment E1 uses an access situation storage unit 15, an application characteristic storage unit 16, a set deadline storage unit 17, and the like. The respective storage units described above can be realized by using, for example, the auxiliary storage device 102.

The load distribution unit 11 functions as a virtual load distribution device. In the embodiment, the load distribution unit 11 switches an access destination from the in-vehicle apparatus 20 to the production environment 12 or the staging environment 13. The switching described above can be realized by, for example, a virtual IP swap.

The production environment 12 is an environment in which the in-vehicle apparatus 20 actually accesses an application that provides the service to the in-vehicle apparatus 20.

The staging environment 13 is an environment in which a previous version production environment is switched for backup by the virtual IP swap or the like. In the embodiment, the environment is referred to as the staging environment 13 for convenience.

In FIG. 3, the production environment 12 and the staging environment 13 of one application are shown. However, when a plurality of applications is installed in the cloud environment E1, there are the production environment 12 and the staging environment 13 for each application. Each of the production environment 12 and the staging environment 13 is, for example, a set of program groups and data groups relating to an operating system (OS), the application, and the like and is a virtual server realized on one virtual machine. For example, when an Azure service is used as a cloud service, a unit referred to as "role" corresponds to each of the production environment 12 and the staging environment 13.

The environment deletion unit 14 executes automatic deletion of the staging environment 13. In FIG. 3, the environment deletion unit 14 includes a deadline deciding unit 141, a deletion execution unit 142, and the like. The deadline deciding unit 141 decides a deletion deadline of the staging environment 13 for each application based on a predetermined condition relating to the application, the predetermined condition being specified with reference to the access situation storage unit 15, the application characteristic storage unit 16, and the like. Hereinafter, a deadline decided by the deadline deciding unit 141 is referred to as "deciding deadline".

The access situation storage unit 15 stores information (parameter) indicating an access situation with respect to the production environment 12 by each application. The application characteristic storage unit 16 stores a parameter set in advance according to a characteristic of each application. The set deadline storage unit 17 stores a deletion deadline set in advance (hereinafter, referred to as "set deadline") by an administrator or the like for each application. For example, the set deadline is a deadline that is set according to circumstances of operation or the like and in which the deletion of the staging environment 13 is permitted (lifted). However, the set deadline may not be set.

When the deciding deadline decided by the deadline deciding unit 141 or the set deadline arrives, the deletion execution unit 142 deletes the staging environment 13 corresponding to the deadline.

Figure 4:
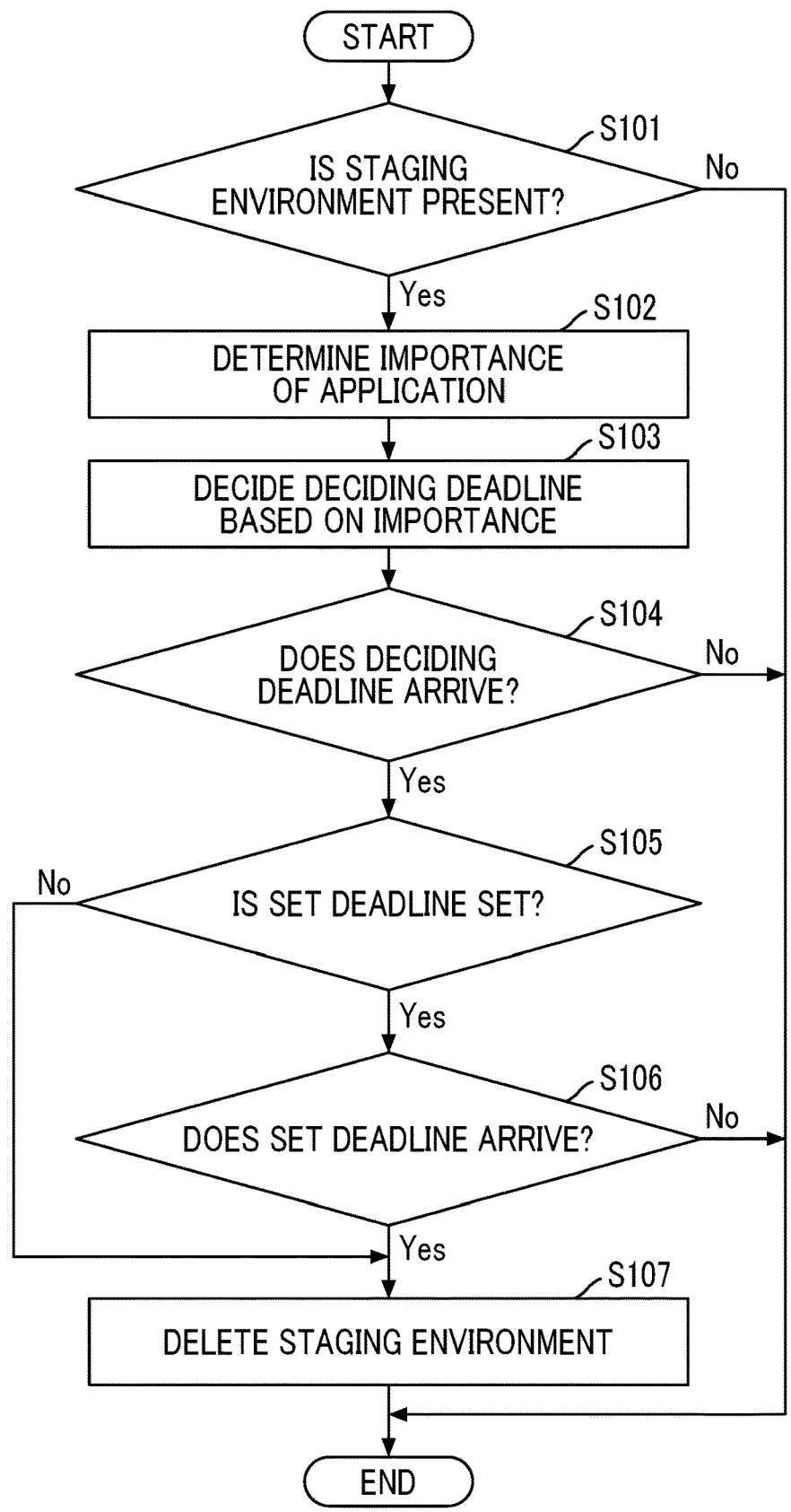
FIG. 4 is a flowchart for describing an example of a process procedure of an automatic deletion process of a staging environment.

Hereinafter, a process procedure executed by the environment deletion unit 14 will be described. FIG. 4 is a flowchart for describing an example of the process procedure of an automatic deletion process of the staging environment 13. The process procedure of FIG. 4 is repeated periodically or continuously, for example, once or several times a day.

In step S101, the deadline deciding unit 141 determines presence or absence of an application of which the staging environment 13 is present (remains). The presence or absence of the staging environment 13 may be confirmed by using an application program interface (API) provided by the cloud service (for example, Azure service) in the cloud environment E1.

When the corresponding application is absent (No in S101), step S102 and the processes after step S102 are not executed. When the corresponding application is present (Yes in S101), the deadline deciding unit 141 determines importance of each corresponding application (hereinafter, referred to as "candidate application") based on a determination reference set in advance (S102).

The importance is an index corresponding to a length of duration of the staging environment 13 of the application. In the embodiment, the more important the application is, the longer the duration of the staging environment 13 is. In the embodiment, the importance is expressed in four stages such as A, B, C, and D, but another expression such as a numerical value may be employed.

The importance is determined based on an application characteristic stored in the application characteristic storage unit 16 for each application and a use situation (access situation) of the production environment 12 by each application, the use situation being stored in the access situation storage unit 15.

The application characteristic includes parameters such as service importance, an allowable time before recovery, and the number of users. The service importance is an index indicating the importance of the service by the application and is set in advance. The allowable time before recovery is an allowable time from a failure to recovery when the failure occurs in the application. The number of users is an estimated number of users who use the application. The number of users may be estimated based on a past version or the latest version of the production environment 12. That is, the application characteristic can be considered information indicating magnitude of an influence of when the application is stopped. Since the staging environment 13 is needed to recover the stop of the application, the application characteristic can be considered information indicating a degree of need for the staging environment 13.

The application characteristic is digitized into a value (hereinafter, referred to as "application characteristic value") having, for example, five stages of one to five based on the service importance, the allowable time before recovery, and the number of users. The digitization method is not limited to a predetermined method. However, as the service is more important, the allowable time before recovery is shorter, and the number of users is larger, the application characteristic value is larger.

On the other hand, the use situation of the production environment 12 includes parameters such as the number of past accesses, the requested number of instances, and a CPU load. The number of past accesses is, for example, the number of transactions (the number of accesses) in the latest 24 hours in the production environment 12. The requested number of instances is, for example, the maximum number of instances (the number of virtual servers in operation) in the latest 24 hours in the production environment 12. The CPU load is the maximum CPU use rate in the latest 24 hours in the production environment 12.

When the importance is calculated, the number of past accesses, the requested number of instances, and the CPU load are respectively converted into evaluation values having five stages of one to five. For example, four threshold values may be set to separate each stage, and the number of past accesses, the requested number of instances, and the CPU load may be compared with respective threshold values to respectively convert the number of past accesses, the requested number of instances, and the CPU load into the evaluation values of one to five.

According to the above description, the importance of a certain application is calculated, for example, as follows.

Importance determination value=application characteristic value+evaluation value of the number of past accesses+evaluation value of the requested number of instances+evaluation value of the CPU load.

When, importance determination value>a threshold value $\alpha 1$, the importance=A.
When, the threshold value $\alpha 1 \geq$ importance determination value>a threshold value $\alpha 2$, the importance=B.
When, the threshold value $\alpha 2 \geq$ importance determination value>a threshold value $\alpha 3$, the importance=C.
When, the threshold value $\alpha 3$ importance determination value, the importance=D.
Here, the threshold value $\alpha 1$>the threshold value $\alpha 2$>the threshold value $\alpha 3$.
Here, the minimum value of the application characteristic value and each of the evaluation values is one, and the maximum value thereof is five. Therefore, the threshold values $\alpha 1$ to $\alpha 3$ are values that divide a range from 4 to 20.

With the method as described above, in step S102, the importance is determined for each candidate application.

The deadline deciding unit 141 decides the deciding deadline based on the importance for each candidate application (S103). For example, a correspondence table between the importance and the duration of the staging environment 13 may be stored in the auxiliary storage device 102 such that the duration of the importance A is 30 days, the duration of the importance B is 20 days, the duration of the importance C is 10 days, and the duration of the importance D is 5 days. In the case, for each candidate application, the deadline deciding unit 141 decides a year, month, and day obtained by adding duration corresponding to the importance of the candidate application to a creation time (for example, a year, month, and day of creation) of the staging environment 13 of the candidate application as a deciding deadline of the candidate application. The creation time of each staging environment 13 (in other words, release time of the production environment 12) is stored in, for example, the auxiliary storage device 102 or the like.

The deletion execution unit 142 determines whether the deciding deadline arrives for each candidate application (S104). When the deciding deadline arrives for any candidate application (Yes in S104), the deletion execution unit 142 determines whether the set deadline is set in the set deadline storage unit 17 for each candidate application for which the deciding deadline arrives (hereinafter, referred to as "deciding deadline arrival application") (S105). When there is a deciding deadline arrival application for which the set deadline is not set (No in S105), the deletion execution unit 142 deletes the staging environment 13 of the deciding deadline arrival application (S107).

On the other hand, when there is a deciding deadline arrival application for which the set deadline is set (Yes in S105), the deletion execution unit 142 determines whether the set deadline of the deciding deadline arrival application arrives (S106). When there is a deciding deadline arrival application for which the set deadline arrives (Yes in S106), the deletion execution unit 142 deletes the staging environment 13 of the deciding deadline arrival application (S107). For a deciding deadline arrival application for which the set deadline does not arrive (No in S106), the deletion of the staging environment 13 is not executed.

In the embodiment, the staging environment 13 is automatically deleted. However, for example, the deletion execution unit 142 may notify the administrator or the like of the presence of the staging environment 13 that is an execution target of step S107. In the case, the deletion of the staging environment 13 may be executed manually by the administrator or the like.

In the embodiment, a client of the application is the in-vehicle apparatus 20. However, the embodiment may be employed for an application to be accessed from another communication apparatus such as a smartphone, a tablet terminal, a personal computer (PC), or an appliance.

According to the embodiment, the deletion deadline of the staging environment 13 is automatically decided based on predetermined conditions such as the characteristic and the use situation of the application, and the staging environment 13 is automatically deleted in response to the arrival of the deletion deadline as described above. Therefore, the staging environment 13 can be deleted at a time according to circumstances for each application, and thus economic efficiency relating to use of a computer resource can be improved.

Since the deletion deadline is decided based on the use situation of the application, for example, deletion deadlines of the staging environments 13 of an application having use frequency higher than predetermined use frequency and an application having use frequency lower than the predetermined use frequency can be changed. Therefore, an appropriate time for each application can be set as the deletion deadline.

Since the deletion deadline is decided based on the characteristic of the application set in advance, the deletion deadline can be set as a time according to the degree of need for the staging environment 13 for each application. Therefore, an appropriate time for each application can be set as the deletion deadline.

Furthermore, the administrator or the like can set the set deadline that is a deadline in which the staging environment 13 can be deleted. Thus, the deletion of the staging environment 13 at a time not intended by the administrator can be avoided. Therefore, the administrator can restrict the deletion timing of the staging environment 13.

In the embodiment, the production environment 12 is an example of a first environment and the staging environment 13 is an example of a second environment.

The embodiment of the disclosure is described in details. The disclosure is not limited to such specific embodiment, and various modifications and changes are possible within the scope of the disclosure described in the claims.

What is claimed is:

1. An information processing device comprising a processor configured to:
    decide a deletion deadline of a second environment based on a predetermined condition relating to an application having a first environment that is a production environment and the second environment that is a staging environment; and
    delete the second environment when the decided deletion deadline arrives, wherein the processor is configured to decide the deletion deadline based on a use situation of the application in the production environment,
    wherein a predetermined threshold time for the staging environment of the application can be set as the deletion deadline based on use frequency, wherein the use frequency includes a number of accesses, a requested number of virtual servers, and a central processing unit load, and
    wherein the processor is configured to decide the deletion deadline based on a parameter set in advance according to a characteristic of the application,
    wherein the characteristic of the application includes an index indicating importance of a service by the application, an allowable time from a failure to recovery when the failure occurs in the application, and an estimated number of users who use the application.

2. The information processing device according to claim 1, wherein the processor is configured to, when a deletion deadline for the application is set in advance, decide the deletion deadline of the second environment that is not the production environment based on the deletion deadline that is set in advance.

3. An information processing method executed by a computer, the information processing method comprising:
    deciding a deletion deadline of a second environment based on a predetermined condition relating to an application having a first environment that is a production environment and the second environment that is a staging environment; and
    deleting the second environment when the decided deletion deadline arrives, wherein the deletion deadline is decided based on a use situation of the application in the production environment,
    wherein a predetermined threshold time for the staging environment of the application can be set as the deletion deadline based on use frequency, wherein the use frequency includes a number of accesses, a requested number of virtual servers, and a central processing unit load, and wherein the deletion deadline is decided based on a parameter set in advance according to a characteristic of the application, wherein the characteristic of the application includes an index indicating importance of a service by the application, an allowable time from a failure to recovery when the failure occurs in the application, and an estimated number of users who use the application.

4. A non-transitory computer-readable medium storing a program causing a computer to execute a process, the process comprising:

deciding a deletion deadline of a second environment based on a predetermined condition relating to an application having a first environment that is a production environment and the second environment that is a staging environment; and deleting the second environment when the decided deletion deadline arrives, wherein the deletion deadline is decided based on a use situation of the application in the production environment, wherein a predetermined threshold time for the staging environment of the application can be set as the deletion deadline based on use frequency, wherein the use frequency includes a number of accesses, a requested number of virtual servers, and a central processing unit load, and wherein the deletion deadline is decided based on a parameter set in advance according to a characteristic of the application, wherein the characteristic of the application includes an index indicating importance of a service by the application, an allowable time from a failure to recovery when the failure occurs in the application, and an estimated number of users who use the application.

* * * * *